United States Patent
Johnson, Jr. et al.

(10) Patent No.: US 7,991,411 B2
(45) Date of Patent: *Aug. 2, 2011

(54) METHOD TO QUALIFY MULTIMEDIA MESSAGE CONTENT TO ENABLE USE OF A SINGLE INTERNET ADDRESS DOMAIN TO SEND MESSAGES TO BOTH SHORT MESSAGE SERVICE CENTERS AND MULTIMEDIA MESSAGE SERVICE CENTERS

(75) Inventors: Carle S. Johnson, Jr., Annapolis, MD (US); Mike Dewey, Arnold, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/959,185

(22) Filed: Oct. 7, 2004

(65) Prior Publication Data

US 2005/0250520 A1 Nov. 10, 2005

Related U.S. Application Data

(60) Provisional application No. 60/568,257, filed on May 6, 2004, provisional application No. 60/568,258, filed on May 6, 2004.

(51) Int. Cl.
*H04W 4/00* (2009.01)
(52) U.S. Cl. ............ 455/466; 455/412.1; 455/428; 709/206; 709/245; 709/246; 370/352; 370/401
(58) Field of Classification Search ............ 455/412.1, 455/412.2, 413, 428, 466, 414.1–414.4, 445, 455/556.2, 560; 370/352, 328, 401; 709/206, 709/207, 245, 246
See application file for complete search history.

(56) References Cited

U.S. PATENT DOCUMENTS

| | | | |
|---|---|---|---|
| 1,103,073 | A | 7/1914 | O'Connell |
| 3,920,908 | A | 11/1975 | Kraus |
| 4,310,726 | A | 1/1982 | Asmuth |
| 4,399,330 | A | 8/1983 | Kuenzel |
| 4,651,156 | A | 3/1987 | Martinez |
| 4,680,785 | A | 7/1987 | Akiyama |

(Continued)

FOREIGN PATENT DOCUMENTS

GB 2308528 6/1997

(Continued)

OTHER PUBLICATIONS

Bond, "Cellular Carriers Use Prepaid Programs to Reach Untapped Markets," Billing World, Mar. 1997, pp. 14-17.

(Continued)

*Primary Examiner* — Anthony S Addy
(74) *Attorney, Agent, or Firm* — William H. Bollman (57) ABSTRACT

A multimedia messaging service (MMS) intelligent content evaluator gateway is provided to allow use of a single address mailbox and Internet domain for receipt of either an MMS or an SMS message. The MMS intelligent content evaluator gateway evaluates the content of a received message, and then forwards the same to the appropriate system for delivery. The MMS intelligent content evaluator gateway makes use of database tables containing subscriber information and message routing tables necessary to derive the MMS and SMS destination addresses for each subscriber or range of subscriber addresses. Tables may also be implemented indicating the capabilities of each subscriber's handset, such as whether or not the handset can support MMS messages.

17 Claims, 9 Drawing Sheets

U.S. PATENT DOCUMENTS

| | | |
|---|---|---|
| 4,706,275 A | 11/1987 | Kamil |
| 4,725,719 A | 2/1988 | Oncken |
| 4,756,020 A | 7/1988 | Fodale |
| 4,776,000 A | 10/1988 | Parienti |
| 4,776,003 A | 10/1988 | Harris |
| 4,776,037 A | 10/1988 | Rozanski, Jr. |
| 4,831,647 A | 5/1989 | D'Avello |
| 4,852,149 A | 7/1989 | Zwick |
| 4,852,155 A | 7/1989 | Barraud |
| 4,860,341 A | 8/1989 | D'Avello |
| 4,891,638 A | 1/1990 | Davis |
| 4,891,650 A | 1/1990 | Sheffer |
| 4,901,340 A | 2/1990 | Parker |
| 4,935,956 A | 6/1990 | Hellwarth |
| 4,952,928 A | 8/1990 | Carroll |
| 5,003,585 A | 3/1991 | Richer |
| 5,014,206 A | 5/1991 | Scribner |
| 5,043,736 A | 8/1991 | Darnell |
| 5,046,088 A | 9/1991 | Margulies |
| 5,055,851 A | 10/1991 | Sheffer |
| 5,063,588 A | 11/1991 | Patsiokas |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,103,449 A | 4/1992 | Jiolissaint |
| 5,119,104 A | 6/1992 | Heller |
| 5,127,040 A | 6/1992 | D'Avello |
| 5,128,938 A | 7/1992 | Borras |
| 5,138,648 A | 8/1992 | Palomegue |
| 5,138,650 A | 8/1992 | Stahl |
| 5,144,283 A | 9/1992 | Arens |
| 5,144,649 A | 9/1992 | Zicker |
| 5,159,625 A | 10/1992 | Zicker |
| 5,161,180 A | 11/1992 | Chavous |
| 5,177,478 A | 1/1993 | Wagai |
| 5,187,710 A | 2/1993 | Chau |
| 5,193,215 A | 3/1993 | Olmer |
| 5,208,756 A | 5/1993 | Song |
| 5,214,789 A | 5/1993 | George |
| 5,216,703 A | 6/1993 | Roy |
| 5,218,367 A | 6/1993 | Sheffer |
| 5,220,593 A | 6/1993 | Zicker |
| 5,223,844 A | 6/1993 | Mansell |
| 5,233,642 A | 8/1993 | Renton |
| 5,239,570 A | 11/1993 | Nunley |
| 5,265,155 A | 11/1993 | Castro |
| 5,265,630 A | 11/1993 | Hartmann |
| 5,266,944 A | 11/1993 | Carroll |
| 5,274,802 A | 12/1993 | Altine |
| 5,276,444 A | 1/1994 | McNair |
| 5,289,527 A | 2/1994 | Tiedemann, Jr. |
| 5,291,543 A | 3/1994 | Freese |
| 5,293,642 A | 3/1994 | Lo |
| 5,297,189 A | 3/1994 | Chabernaud |
| 5,299,132 A | 3/1994 | Wortham |
| 5,301,223 A | 4/1994 | Amadon |
| 5,301,234 A | 4/1994 | Mazziotto |
| 5,309,501 A | 5/1994 | Kozik |
| 5,311,572 A | 5/1994 | Friedes |
| 5,321,735 A | 6/1994 | Breeden |
| 5,325,302 A | 6/1994 | Izidon |
| 5,325,418 A | 6/1994 | McGregor |
| 5,327,144 A | 7/1994 | Stilp |
| 5,329,578 A | 7/1994 | Brennan |
| 5,334,974 A | 8/1994 | Simms |
| 5,339,352 A | 8/1994 | Armstrong |
| 5,341,410 A | 8/1994 | Aron |
| 5,341,414 A | 8/1994 | Popke |
| 5,343,493 A | 8/1994 | Karimullah |
| 5,347,568 A | 9/1994 | Moody |
| 5,351,235 A | 9/1994 | Lahtinen |
| 5,353,335 A | 10/1994 | D'Urso |
| 5,359,182 A | 10/1994 | Schilling |
| 5,359,642 A | 10/1994 | Castro |
| 5,359,643 A | 10/1994 | Castro |
| 5,361,212 A | 11/1994 | Class |
| 5,363,425 A | 11/1994 | Mufti |
| 5,369,699 A | 11/1994 | Page |
| 5,374,936 A | 12/1994 | Feng |
| 5,379,451 A | 1/1995 | Nakagoshi |
| 5,381,338 A | 1/1995 | Wysocki |
| 5,384,825 A | 1/1995 | Dillard |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Carroll |
| 5,396,545 A | 3/1995 | Nair et al. |
| 5,396,558 A | 3/1995 | Ishiguro |
| 5,398,190 A | 3/1995 | Wortham |
| 5,404,580 A | 4/1995 | Simpson |
| 5,406,614 A | 4/1995 | Hara |
| 5,408,513 A | 4/1995 | Busch, Jr. |
| 5,408,519 A | 4/1995 | Pierce |
| 5,408,682 A | 4/1995 | Ranner |
| 5,412,726 A | 5/1995 | Nevoux |
| 5,418,537 A | 5/1995 | Bird |
| 5,423,076 A | 6/1995 | Westergren |
| 5,432,841 A | 7/1995 | Rimer |
| 5,434,789 A | 7/1995 | Fraker |
| 5,438,615 A | 8/1995 | Moen |
| 5,440,621 A | 8/1995 | Castro |
| 5,454,024 A | 9/1995 | Lebowitz |
| 5,457,737 A | 10/1995 | Wen |
| 5,461,390 A | 10/1995 | Hosher |
| 5,465,289 A | 11/1995 | Kennedy, Jr. |
| 5,469,497 A | 11/1995 | Pierce |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,485,505 A | 1/1996 | Norman |
| 5,488,563 A | 1/1996 | Chazelle |
| 5,494,091 A | 2/1996 | Freeman |
| 5,497,149 A | 3/1996 | Fast |
| 5,502,761 A | 3/1996 | Duncan |
| 5,506,893 A | 4/1996 | Buscher |
| 5,508,931 A | 4/1996 | Snider |
| 5,509,056 A | 4/1996 | Ericsson |
| 5,513,243 A | 4/1996 | Kage |
| 5,515,287 A | 5/1996 | Hakoyama |
| 5,517,555 A | 5/1996 | Amadon |
| 5,517,559 A | 5/1996 | Hayashi |
| 5,519,403 A | 5/1996 | Bickley |
| 5,532,690 A | 7/1996 | Hertel |
| 5,535,434 A | 7/1996 | Siddoway |
| 5,539,398 A | 7/1996 | Hall |
| 5,543,776 A | 8/1996 | L'Esperance |
| 5,550,897 A | 8/1996 | Seiderman |
| 5,552,772 A | 9/1996 | Janky |
| 5,555,286 A | 9/1996 | Tendler |
| 5,568,119 A | 10/1996 | Schipper |
| 5,570,416 A | 10/1996 | Kroll |
| 5,574,648 A | 11/1996 | Pilley |
| 5,577,100 A | 11/1996 | McGregor |
| 5,579,372 A | 11/1996 | Angstrom |
| 5,579,376 A | 11/1996 | Kennedy |
| 5,583,918 A | 12/1996 | Nakagawa |
| 5,586,175 A | 12/1996 | Hogan |
| 5,588,009 A | 12/1996 | Will |
| 5,592,535 A | 1/1997 | Klotz |
| 5,604,486 A | 2/1997 | Lauro |
| 5,606,313 A | 2/1997 | Allen |
| 5,606,850 A | 3/1997 | Nakamura |
| 5,610,815 A | 3/1997 | Gudat |
| 5,610,972 A | 3/1997 | Emery |
| 5,614,890 A | 3/1997 | Fox |
| 5,615,116 A | 3/1997 | Gudat |
| 5,621,793 A | 4/1997 | Bednarek |
| 5,625,669 A | 4/1997 | McGregor |
| 5,628,051 A | 5/1997 | Salin |
| 5,633,912 A | 5/1997 | Tsoi |
| 5,640,447 A | 6/1997 | Fonseca |
| 5,682,600 A | 10/1997 | Salin |
| 5,722,067 A | 2/1998 | Fougnies |

| Patent # | Kind | Date | Name | | Patent # | Kind | Date | Name |
|---|---|---|---|---|---|---|---|---|
| 5,732,346 | A | 3/1998 | Lazaridis | | 6,223,046 | B1 | 4/2001 | Hamill-Keays |
| 5,740,534 | A | 4/1998 | Ayerst | | 6,226,529 | B1 | 5/2001 | Bruno |
| 5,761,618 | A | 6/1998 | Lynch | | 6,249,680 | B1 | 6/2001 | Wax |
| 5,767,795 | A | 6/1998 | Schaphorst | | 6,249,744 | B1 | 6/2001 | Morita |
| 5,768,509 | A | 6/1998 | Gunluk | | 6,266,614 | B1 | 7/2001 | Alumbaugh |
| 5,774,533 | A | 6/1998 | Patel | | 6,289,373 | B1 | 9/2001 | DeZonno |
| 5,778,313 | A | 7/1998 | Fougnies | | 6,311,055 | B1 | 10/2001 | Boltz |
| 5,787,357 | A | 7/1998 | Salin | | 6,314,108 | B1 | 11/2001 | Ramasubramani |
| 5,790,636 | A | 8/1998 | Marshall | | 6,317,594 | B1 | 11/2001 | Gossman |
| 5,793,859 | A | 8/1998 | Matthews | | 6,327,479 | B1 | 12/2001 | Mikkola |
| 5,794,142 | A | 8/1998 | Vanttila | | 6,335,968 | B1 | 1/2002 | Malik |
| 5,797,094 | A | 8/1998 | Houde | | 6,356,630 | B1 | 3/2002 | Cai |
| 5,797,096 | A | 8/1998 | Lupien | | 6,370,242 | B1 | 4/2002 | Speers |
| 5,802,492 | A | 9/1998 | DeLorme | | 6,373,930 | B1 | 4/2002 | McConnell |
| 5,806,000 | A | 9/1998 | Vo | | 6,381,316 | B2 | 4/2002 | Joyce |
| 5,815,816 | A | 9/1998 | Isumi | | 6,393,269 | B1 | 5/2002 | Hartmaier |
| 5,822,700 | A | 10/1998 | Hult | | 6,396,913 | B1 | 5/2002 | Perkins, III |
| 5,826,185 | A | 10/1998 | Wise | | 6,397,055 | B1 | 5/2002 | McHenry |
| 5,828,740 | A | 10/1998 | Khuc | | 6,408,177 | B1 | 6/2002 | Parikh |
| 5,850,599 | A | 12/1998 | Seiderman | | 6,424,841 | B1 | 7/2002 | Gustafsson |
| 5,854,975 | A | 12/1998 | Fougnies | | 6,442,257 | B1 | 8/2002 | Gundlach |
| 5,856,974 | A | 1/1999 | Gervais | | 6,446,112 | B1 | 9/2002 | Bunney |
| 5,905,736 | A | 5/1999 | Ronen | | 6,459,892 | B2 | 10/2002 | Burgan |
| 5,920,821 | A | 7/1999 | Seazholtz | | 6,470,181 | B1 | 10/2002 | Maxwell |
| 5,930,701 | A | 7/1999 | Skog | | 6,473,622 | B1 | 10/2002 | Meuronen |
| 5,940,755 | A | 8/1999 | Scott | | 6,480,710 | B1 | 11/2002 | Laybourn |
| 5,941,945 | A | 8/1999 | Aditham | | 6,483,907 | B1 | 11/2002 | Wong |
| 5,943,399 | A | 8/1999 | Bannister | | 6,490,450 | B1 | 12/2002 | Batni |
| 5,946,629 | A | 8/1999 | Sawyer | | 6,493,430 | B2 | 12/2002 | Leuca |
| 5,946,630 | A | 8/1999 | Willars | | 6,529,593 | B2 | 3/2003 | Nelson |
| 5,950,130 | A | 9/1999 | Coursey | | 6,529,732 | B1 | 3/2003 | Vainiomaki |
| 5,953,398 | A | 9/1999 | Hill | | 6,560,456 | B1 | 5/2003 | Lohtia et al. |
| 5,959,543 | A | 9/1999 | LaPorta | | 6,587,688 | B1 | 7/2003 | Chambers |
| 5,960,074 | A | 9/1999 | Clark | | 6,587,691 | B1 | 7/2003 | Granstam |
| 5,963,864 | A | 10/1999 | O'Neil | | 6,625,461 | B1 | 9/2003 | Bertacchi |
| 5,974,054 | A | 10/1999 | Couts | | 6,658,260 | B2 | 12/2003 | Knotts |
| 5,974,133 | A | 10/1999 | Fleischer, III | | 6,718,178 | B1 | 4/2004 | Sladek et al. |
| 5,978,685 | A | 11/1999 | Laiho | | 6,771,971 | B2 | 8/2004 | Smith |
| 5,983,091 | A | 11/1999 | Rodriguez | | 6,856,804 | B1 | 2/2005 | Ciotta |
| 5,987,323 | A | 11/1999 | Huotari | | 6,886,017 | B1 | 4/2005 | Jackson et al. |
| 5,998,111 | A | 12/1999 | Abe | | 6,956,832 | B1 * | 10/2005 | Muhonen et al. ............ 370/310 |
| 5,999,811 | A | 12/1999 | Molne | | 6,987,969 | B1 | 1/2006 | Bruing |
| 6,026,292 | A | 2/2000 | Coppinger | | 7,010,303 | B2 | 3/2006 | Lewis |
| 6,029,062 | A | 2/2000 | Hanson | | 7,058,036 | B1 | 6/2006 | Yu et al. |
| 6,035,025 | A | 3/2000 | Hanson | | 7,116,972 | B1 | 10/2006 | Zhang |
| 6,049,710 | A | 4/2000 | Nilsson | | 7,120,418 | B2 | 10/2006 | Herajarvi |
| 6,058,300 | A | 5/2000 | Hanson | | 7,154,901 | B2 | 12/2006 | Chava |
| 6,064,875 | A | 5/2000 | Morgan | | 7,171,190 | B2 * | 1/2007 | Ye et al. ..................... 455/412.1 |
| 6,070,067 | A | 5/2000 | Nguyen | | 7,181,538 | B2 | 2/2007 | Tam |
| 6,075,982 | A | 6/2000 | Donovan | | 7,224,696 | B2 | 5/2007 | Bouleros |
| 6,081,508 | A | 6/2000 | West | | 7,409,428 | B1 | 8/2008 | Brabec |
| 6,101,378 | A | 8/2000 | Barabash | | 7,480,915 | B2 * | 1/2009 | Costa Requena et al. .... 719/311 |
| 6,115,458 | A | 9/2000 | Taskett | | 7,486,641 | B2 | 2/2009 | Reddy |
| 6,122,503 | A | 9/2000 | Daly | | 7,509,136 | B2 | 3/2009 | Hart |
| 6,122,510 | A | 9/2000 | Granberg | | 7,519,654 | B1 | 4/2009 | Smith |
| 6,122,520 | A | 9/2000 | Want | | 7,627,305 | B2 | 12/2009 | Helferich |
| 6,134,432 | A | 10/2000 | Holmes | | 7,809,382 | B2 | 10/2010 | Smith |
| 6,138,158 | A | 10/2000 | Boyle | | 7,860,068 | B2 | 12/2010 | Smith |
| 6,144,653 | A | 11/2000 | Persson | | 2001/0040949 | A1 | 11/2001 | Blonder |
| 6,148,197 | A | 11/2000 | Bridges | | 2001/0041579 | A1 | 11/2001 | Smith |
| 6,148,198 | A | 11/2000 | Anderson | | 2002/0007421 | A1 * | 1/2002 | Dixon et al. .................. 709/238 |
| 6,149,353 | A | 11/2000 | Nilsson | | 2002/0103762 | A1 | 8/2002 | Lopez |
| 6,157,823 | A | 12/2000 | Fougnies | | 2003/0040300 | A1 | 2/2003 | Bodic |
| 6,157,831 | A | 12/2000 | Lamb | | 2003/0092454 | A1 | 5/2003 | Halim |
| 6,169,891 | B1 | 1/2001 | Gorham | | 2003/0105864 | A1 * | 6/2003 | Mulligan et al. ............. 709/225 |
| 6,173,181 | B1 | 1/2001 | Losh | | 2003/0193967 | A1 | 10/2003 | Fenton |
| 6,181,935 | B1 | 1/2001 | Gossman | | 2004/0185833 | A1 * | 9/2004 | Rukman ...................... 455/466 |
| 6,188,752 | B1 | 2/2001 | Lesley | | 2004/0196858 | A1 | 10/2004 | Tsai |
| 6,189,031 | B1 | 2/2001 | Badger | | 2004/0242202 | A1 * | 12/2004 | Torvinen .................... 455/412.1 |
| 6,192,241 | B1 | 2/2001 | Yu | | 2004/0259531 | A1 | 12/2004 | Wood |
| 6,195,543 | B1 | 2/2001 | Granberg | | 2005/0004968 | A1 | 1/2005 | Mononen |
| 6,198,431 | B1 | 3/2001 | Gibson | | 2005/0064884 | A1 | 3/2005 | Dumont |
| 6,199,045 | B1 | 3/2001 | Giniger | | 2005/0076084 | A1 * | 4/2005 | Loughmiller et al. ......... 709/206 |
| 6,205,330 | B1 | 3/2001 | Winbladh | | 2005/0078660 | A1 * | 4/2005 | Wood ............................ 370/352 |
| 6,208,854 | B1 | 3/2001 | Roberts | | 2005/0132060 | A1 | 6/2005 | Mo |
| 6,208,870 | B1 | 3/2001 | Lorello | | 2005/0141522 | A1 | 6/2005 | Kadar |
| 6,216,008 | B1 | 4/2001 | Lee | | 2005/0164721 | A1 * | 7/2005 | Yeh et al. .................... 455/466 |
| 6,219,669 | B1 | 4/2001 | Haff | | 2005/0176409 | A1 * | 8/2005 | Carpenter ................. 455/412.1 |
| 6,223,042 | B1 | 4/2001 | Raffel | | 2005/0186974 | A1 | 8/2005 | Cai |

| | | |
|---|---|---|
| 2006/0053197 A1 | 3/2006 | Yoshimura |
| 2006/0194595 A1 | 8/2006 | Myllynen |
| 2010/0257241 A1 | 10/2010 | Hale |

FOREIGN PATENT DOCUMENTS

| | | |
|---|---|---|
| WO | WO97/41654 | 11/1997 |
| WO | WO9856160 | 12/1998 |
| WO | WO9960801 | 11/1999 |
| WO | WO0028746 | 5/2000 |

OTHER PUBLICATIONS

Freedom Wireless, "The Freedom to Chose! Get Pre-Pay Cellular," sales pamphlet, undated.
MultiMedia Publishing Corp., "Prepaid Cellular and Prepaid Wireless Market Report and Forecast 1997-2002," sales literature, undated.
Nextlink, "Introducing a New Prepaid Telephone Service from Nextlink," sales literature, undated.
Open Development Corp., "openMedia Cellular Prepaid," sales literature, undated.
Tecore, Inc., "Pre-Paid Cellular," sales literature, Mar. 25, 1997, pp. 1-4.
The Power of Mobile Unified Messaging: Siemans and Comverse to Demonstrate WAP-Based Messaging Applications on Live GPRS System, Comverse, Feb. 2000.
ETSI/3Gpp, $3^{rd}$ Generation Partnership Project; Technical Specification Group Services and System Aspects; General Packet Radio Service (GPRS); Service description; Stage 2; (3G TS 23.060 version 3.2.1), Jan. 2000, pp. 138-142.
ETSI,3GPP, $3^{rd}$ Generation Partnership Project; Technical Specification Group Core Network; Customized Applications for Mobile network Enhanced Logic; (CAMEL) Phase 3—Stage 2 (3G TS 23.078 version 3.3.0), 12/199, pp. 300-329.
Newsletter "Sonera Bill Warning" Digital Cellular Report. Stevenage: Jun. 17, 1998. vol. 4, Iss.; p. 1.
"Technology Rides Control Network to Support Short Package Applications"; Advanced Intelligent Network New. Washington, DC: Mar. 19, 1997. vol. 7, Iss. 6; p. 1.
Cellular Mobile Pricing Structures and Trends; Dr. Sam Paltridge of the OECD's Directorate for Science, Technology and Industry; Dist.: May 19, 2000 (Nov. 1999).
Bond, "Cellular Carriers Use Prepaid Programs to Reach Untapped Markets," Billing World, Mar. 1997, pp. 14-17.
Freedom Wireless, "The Freedom to Chose! Get Pre-Pay Cellular," sales pamphlet, undated.
MultiMedia Publishing Corp., "Prepaid Cellular and Prepaid Wireless Market Report and Forecast 1997-2002," sales literature, undated.
Nextlink, "Introducing a New Prepaid Telephone Service from Nextlink," sales literature, undated.
Open Development Corp., "openMedia Cellular Prepaid," sales literature, undated.
Tecore, Inc., "Pre-Paid Cellular," sales literature, Mar. 25, 1997, pp. 1-4.
The Power of Mobile Unified Messaging: Siemans and Comverse to Demonstrate WAP-Based Messaging Applications on Live GPRS System, Comverse, Feb. 2000.
ETSI/3Gpp, $3^{rd}$ Generation Partnership Project; Technical Specification Group Services and System Aspects; General Packet Radio Service (GPRS); Service description; Stage 2; (3G TS 23.060 version 3.2.1), Jan. 2000, pp. 138-142.
ETSI,3GPP, $3^{rd}$ Generation Partnership Project; Technical Specification Group Core Network; Customized Applications for Mobile network Enhanced Logic; (CAMEL) Phase 3— Stage 2 (3G TS 23.078 version 3.3.0), 12/199, pp. 300-329.

* cited by examiner

METHOD TO QUALIFY MULTIMEDIA MESSAGE CONTENT TO ENABLE USE OF A SINGLE INTERNET ADDRESS DOMAIN TO SEND MESSAGES TO BOTH SHORT MESSAGE SERVICE CENTERS AND MULTIMEDIA MESSAGE SERVICE CENTERS

This application claims priority from U.S. Provisional Application No. 60/568,257 filed May 6, 2004, entitled "Method to Qualify Multimedia Message Context to Enable Use of a Single Internet Address Domain to Send Messages to Both Short Message Service Centers and Multimedia Message Service Centers" to Carle S. Johnson, Jr. et al.; and from U.S. Provisional Application No. 60/568,258 filed May 6, 2004, entitled "Gateway Application to Support Use of a Single Internet Address Domain for Routing Messages to Multiple Multimedia Service Centers" to Carle S. Johnson, Jr., et al., the entirety of both of which are expressly incorporated herein by reference.

BACKGROUND OF THE INVENTION

1. Field of the Invention

This invention relates to wireless telecommunications, and in particular to multimedia messaging services (MMS) and/or to short messaging services (SMS).

2. Background of Related Art

The world has been transformed by the emergence of electronic messaging. Initially, short messaging services (SMS) were developed to allow text messaging. Later, these text capabilities were expanded to include audio and images with multimedia messaging services (MMS).

Wireless Service Providers (carriers) currently install a Short Messaging Service Center (SMSC) between the Internet and their wireless network to support plain text short messaging (SMS) to subscriber handsets. To support MMS services, carriers also install a Multimedia Messaging Service Center (MMSC) between the Internet and their wireless network. Conventional MMSCs do not support SMS text messaging.

Figure 7:
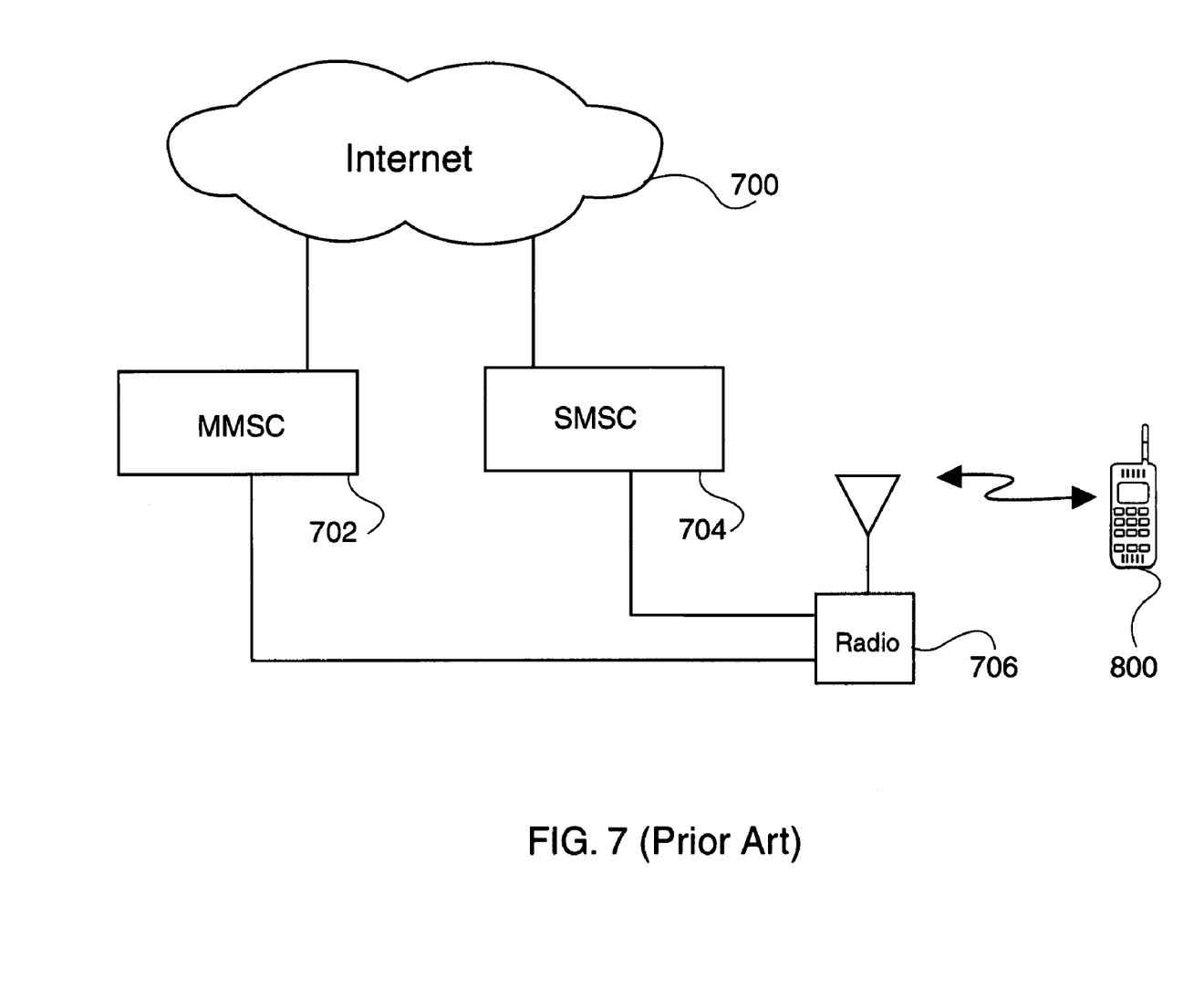
FIG. 7 depicts the current state of the art of an installation of an MMSC and an SMSC both serving a single subscriber but requiring two separate Internet addresses.

FIG. 7 depicts the current state of the art of an installation of an MMSC and an SMSC both serving a single subscriber but requiring two separate Internet addresses.

In particular, as shown in FIG. 7, an MMSC 702 is given a presence on the Internet 700, as is an SMSC 704. Each presence is required to have its own Universal Resource Locator (URL). Through these connections to the Internet, a message sender may direct a short message (e.g., a text message) to a supported subscriber 800 via the their carrier's servicing SMSC 704, or may direct a multimedia message (MMS) to the same subscriber 800 via their carrier's servicing MMSC 702 (provided that the subscriber's mobile device is capable of receiving MMS content). Therefore a person desiring to send a message to a subscriber with both SMS and MMS capability is required to remember two addresses for the same subscriber and to manually determine which address to use based on the content of the message they wish to send.

Thus, carriers providing Multimedia Messaging Services utilize an MMSC 702 to receive MMS messages for delivery to subscribers with MMS capability, and one or more SMSCs 704 to receive SMS messages for delivery to SMS subscribers (many of whom may also be MMS subscribers). To provide these multiple services (MMS and SMS), the carrier must use multiple domain names (one URL for the MMSC 702 to support Multimedia Messaging, and another URL for the SMSC 704 to support Short Message Service) for each subscriber 800 who desires both capabilities within a single carrier network.

For information relating to components of the MMS standard, reference is made to 3GPP TS 23.140 v6.5.0 Technical Specification—$3^{rd}$ Generation Partnership Project; Technical Specification Group Terminals; Multimedia Messaging Service (MMS); Functional description; Stage 2 (Release 6).

In order for an MMSC 702 and an SMSC 704 to both receive messages destined for the same handset 800, it is necessary for the MMSC 702 and the SMSC 704 to each be referenced by unique Internet domain names. This requires that when addressing a message, the sender must be aware of whether they are sending an SMS or an MMS message, and correspondingly which domain is appropriate through which to access the destination subscriber handset, based on the particular content of the message they are sending. Thus, the sender must remember two different Internet addresses for any particular addressee.

The present inventors have appreciated that the need to remember at least two different Internet addresses for the same destination subscriber has a high likelihood of causing confusion for message senders as to which domain to use for which message type, and perhaps even what specific message type they are sending. If a message is sent to an MMSC for a particular subscriber instead of to their SMSC for a plain text short message, or vice versa for a multimedia message, loss of the message will likely result, causing lost revenue to the wireless service provider (carrier), not to mention disappointed subscribers. Moreover, subscriber information, routing information and reporting mechanisms must be duplicated in two systems.

There is a need for techniques and architecture for SMS and MMS services which are simpler to implement from a sender's perspective, and which ensure maximum profitability from a carrier's perspective.

SUMMARY OF THE INVENTION

In accordance with the principles of the present invention, a wireless carrier message gateway comprises a module to detect a message type of a received message addressed to a URL assigned to the wireless carrier message gateway. A routing module forwards at least a portion of the received message to a multimedia messaging service center (MMSC) if a message type of the received message is detected to be a multimedia (MMS) type message and the destination subscriber is registered in an internal database as having a handset with the capability to receive multimedia messages. A routing module also forwards the received message to a short message service center (SMSC) if the message type of the received message is detected to be a short message (SMS) type message.

A method of providing a single domain name for multiple message types in a wireless network, in accordance with another aspect of the present invention, comprises detecting a message type of a received message addressed to a destination subscriber serviced through the single domain name. If a message type of the received message is detected to be a multimedia (MMS) type message, at least a portion of the received message is forwarded to a multimedia messaging service center (MMSC) servicing the destination subscriber. If the message type of the received message is detected to be a short message (SMS) type message, the received message is forwarded to a short message service center (SMSC) servicing the destination subscriber. If the message type of the received message is detected to be a multimedia (MMS)

message, but it is determined by a database query that the handset of the destination subscriber cannot receive MMS messages, all non-text components of the MMS message are removed and the text portion is sent to the subscriber as an SMS message. Optionally, an MMS message to a non-MMS capable subscriber can be forwarded to an alternate address, such as a web page designed to allow the subscriber the ability to view the MMS message using an appropriate web browser.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a method and technique for evaluating message content on messages received from both internal or external message sources and routing messages appropriately to SMSCs or MMSCs based on automated evaluation of the message content and the stored capabilities of the subscriber's client device.

Currently, Multimedia Messaging Service Centers and Short Message Service Centers used in a single network require the sender to differentiate between message types, and to send each type to the appropriate domain address corresponding to a gateway capable of receiving that particular message type. The present invention provides the ability to use a single address mailbox and domain for both MMS and SMS messages. Thus, wireless carrier networks providing multimedia messaging and short message service may allow utilization of both the Multimedia Messaging Service Centers as well as the Short Message Service Centers in a manner which allows all messages to be sent addressed to a single Internet domain.

Figure 1:
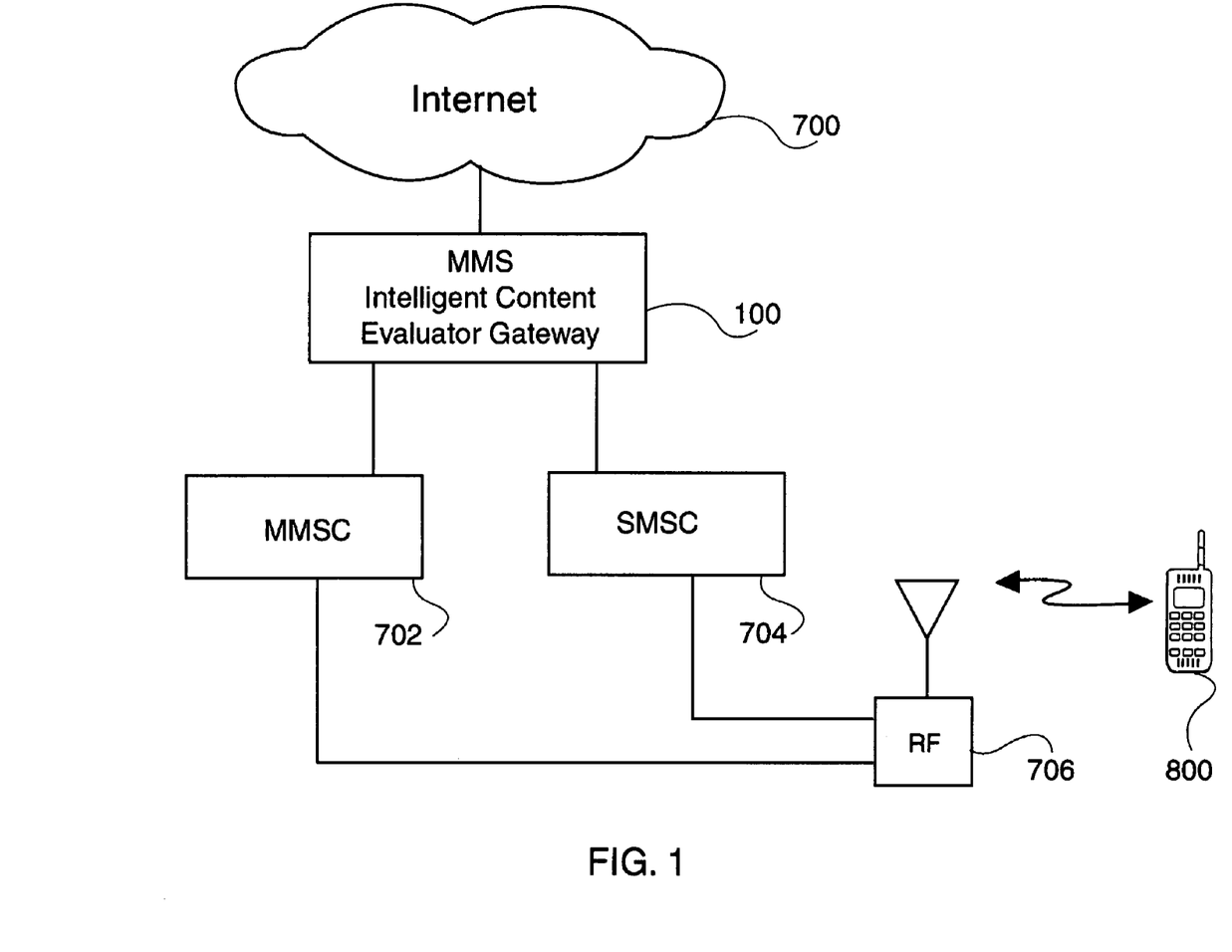
FIG. 1 depicts an MMS gateway including an intelligent content evaluator requiring only a single Internet presence (URL), through which MMS messages are detected and routed to an MMSC for presentation to a subscriber, and SMS messages are detected and routed to an SMSC for presentation to the subscriber, in accordance with the principles of the present invention.

FIG. 1 depicts an MMS gateway 100 including an intelligent content evaluator requiring only a single Internet presence (URL), through which MMS messages are detected and routed to an MMSC 702 for presentation to a subscriber 800, and through which SMS messages are detected and routed to an SMSC 704 for presentation to the subscriber 800, in accordance with the principles of the present invention.

In particular, as shown in FIG. 1, an MMS Intelligent Content Evaluator gateway 100 is interposed between the Internet 700 and both an otherwise conventional MMSC 702 and SMSC 704 in a carrier's wireless network.

The MMS intelligent content evaluator gateway 100 includes appropriate methods, functions and features allowing it to detect message content type. Based on the detected message content type, routing is then determined to the appropriate MMSC 702 or SMSC 704 servicing the addressed subscriber 800. The MMS intelligent content evaluator gateway 100 then forwards messages to the appropriate system (MMSC 702 or SMSC 704) for delivery based on the detected message content type and the messaging capabilities of the destination subscriber's handset discovered via a database query.

The MMS intelligent content evaluator gateway 100 presents a single Internet mail domain to the Internet, through which all messages (e.g., MMS and SMS) addressed to a particular subscriber serviced by the carrier's network can be directed.

The disclosed MMS intelligent content evaluator gateway 100 includes software components required to receive and forward messages between the Internet 700 and both the carrier's network Multimedia Messaging Service Centers (MMSCs) 702 as well as the carrier's Short Message Service Centers (SMSC) 704.

Figure 2:
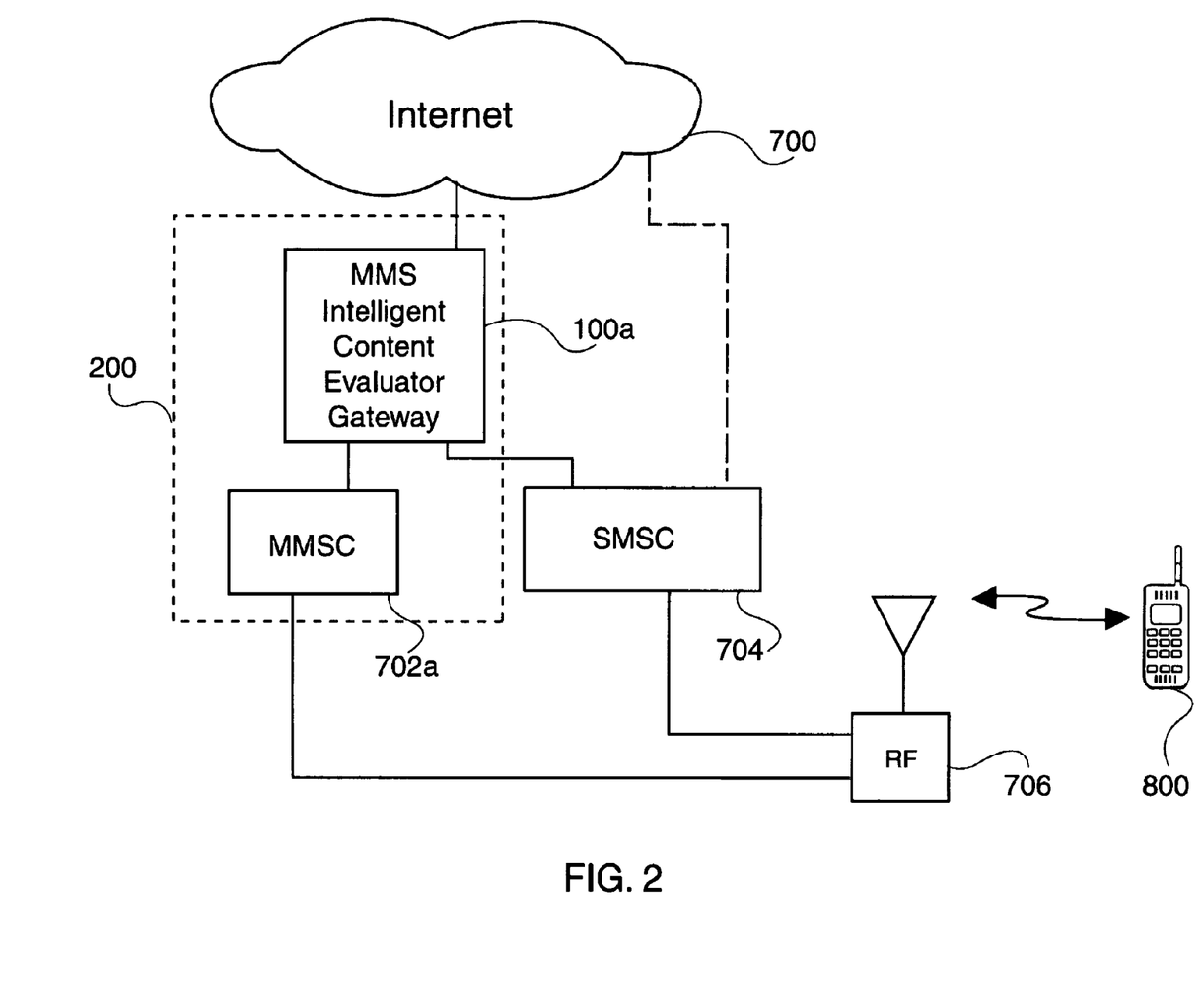
FIG. 2 depicts an MMS gateway including an intelligent content evaluator requiring only a single Internet presence (URL) such as is shown in FIG. 1, included within an MMSC, in accordance with another embodiment of the present invention.

FIG. 2 depicts an MMS gateway including an intelligent content evaluator 100a included within an MMSC server 200, requiring only a single Internet presence (URL) such as is shown in FIG. 1, in accordance with another embodiment of the present invention.

Thus, as shown in FIG. 2, the disclosed MMS gateway including an intelligent content evaluator 100a may be integrated with the MMSC 702a itself.

In an alternative embodiment, the SMSC 704 may maintain the ability to be directly accessed from the Internet 700 (depicted by dotted line in FIG. 2), though this feature is not required for implementation of the principles of the present invention.

Figure 3:
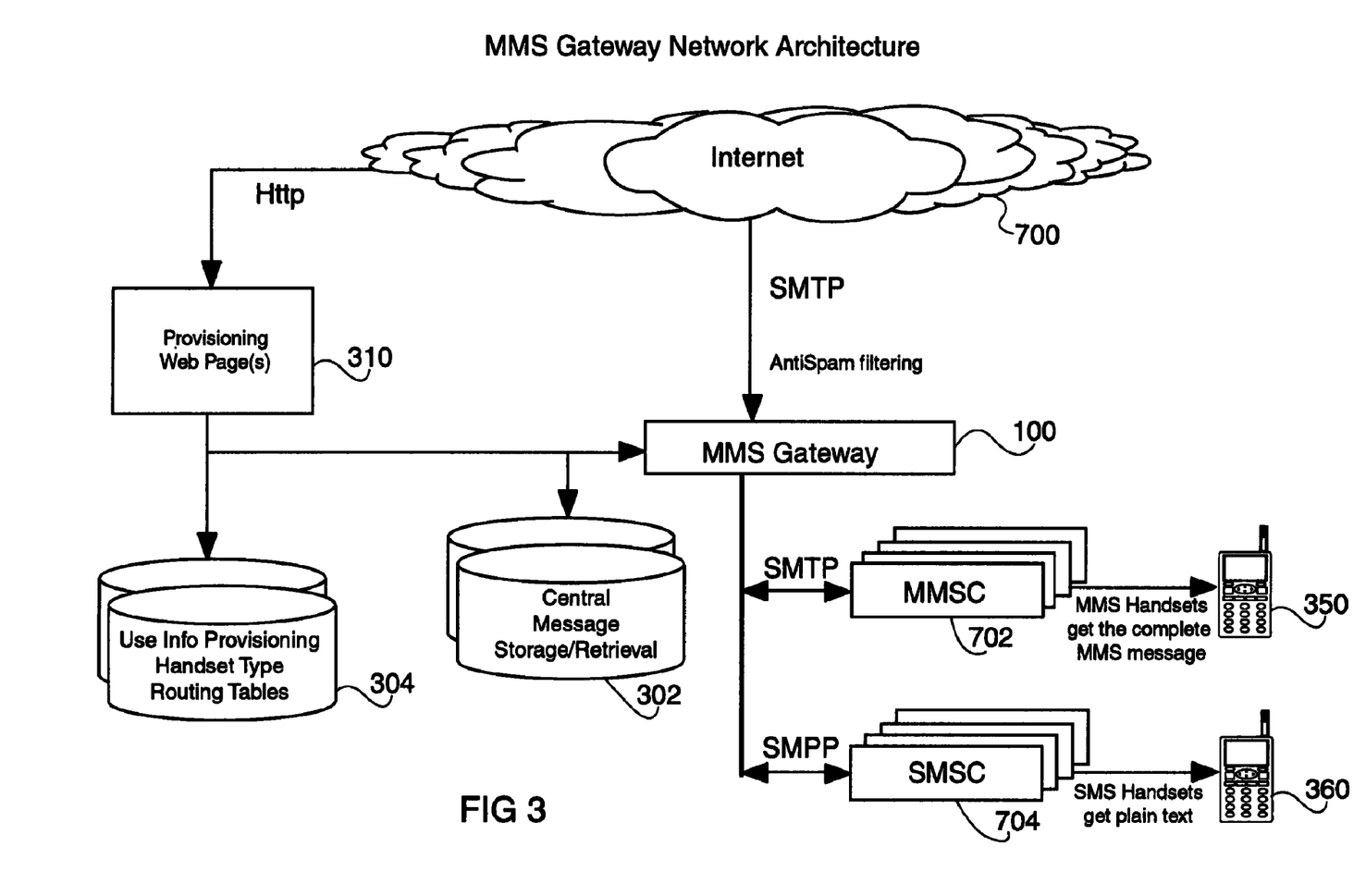
FIG. 3 shows an exemplary embodiment of an MMS gateway network architecture, in accordance with the principles of the present invention.

FIG. 3 shows an exemplary embodiment of an MMS gateway network architecture, in accordance with the principles of the present invention.

In particular, as shown in FIG. 3, an MMS intelligent content evaluator gateway 100 is provided with a presence on the Internet 700 (e.g., capable of passing messages via SMTP protocol). As shown in FIG. 3, the MMS intelligent content evaluator gateway 100 provides a carrier with the ability to filter spam messages at a single point (e.g., within the MMS intelligent content evaluator gateway 100).

Database user tables are preferably implemented in a suitable user information provisioning/handset type/routing tables database 304, which is accessible by the MMS intelligent content evaluator gateway 100. The user tables in the database 304 may contain, e.g., subscriber information and message routing tables necessary to derive appropriate MMS and SMS destination addresses for each subscriber, or range of subscriber addresses.

The user tables in the database 304 also preferably indicate capabilities of the carrier's subscriber's handset. For instance, at a minimum, capabilities included in the tables should include information relating to whether or not the handset 800 can support MMS messages.

The user tables in the database 304 may be provisioned through an appropriate application, or through a provisioning web page 310.

When multimedia messages (MMS) are processed through the MMS intelligent content evaluator gateway 100, complex messages can be filtered down to the highest resolution that the subscriber's handset can display. For example, consider an inbound MMS message sent to a group with a mixed selection of phones, some of which are capable of handling MMS messages, others of which are capable of handling only SMS plain text type messages.

The protocols required to connect MMSCs and SMSCs are varied and not specific for practice of the present invention. For instance, the MMSC can be addressed via MM3 (SMTP), MM4 (MMS Extended SMTP) and MM7 (SOAP) interfaces. SMSCs can be addressed by various protocols. The disclosed embodiments support SMPP, CDMP, TNPP & OIS protocols. Nevertheless, the particular protocol is not dictated by the present invention.

MMS messages are routed to the MMSC 702 by the MMS intelligent content evaluator gateway 100. SMS messages are routed to the SMSC 704 by the intelligent content evaluator gateway 100. Other types of messages may be routed to appropriate gateways, preferably using protocols standard in a direct connection of the relevant gateway with the Internet 700.

As shown in FIG. 3, MMS handsets 350 capable of displaying a complete MMS message receive the complete MMS message routed by the MMS intelligent content evaluator gateway 100 to the MMSC 702 that provides service to the MMS handset 350. Handsets 360 capable of displaying only plain text receive only the plain text portion of the message via the relevant SMSC 704.

Figure 4:
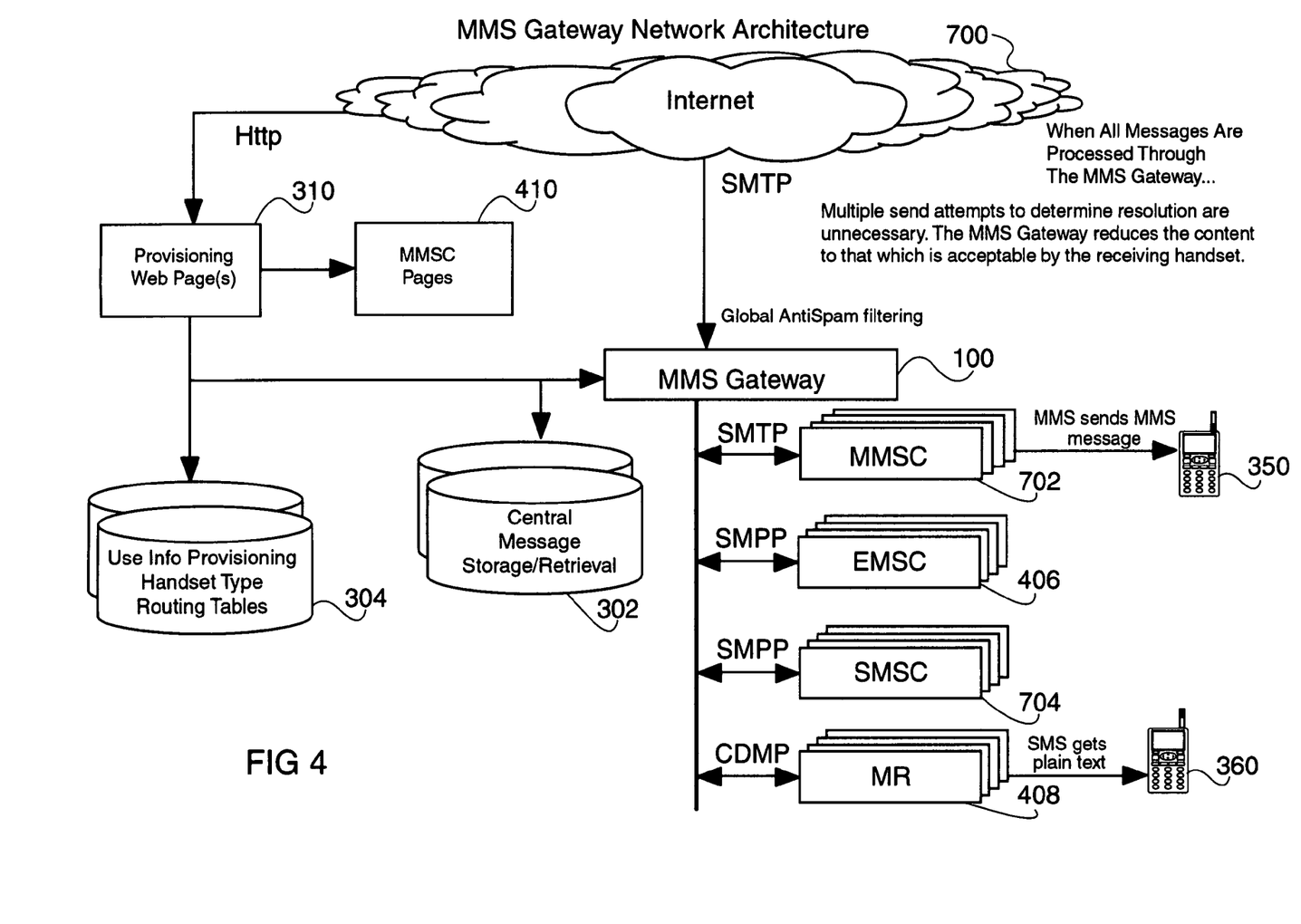
FIG. 4 shows another exemplary embodiment of an MMS gateway network architecture, in accordance with the principles of the present invention.

FIG. 4 shows another exemplary embodiment of an MMS gateway network architecture, in accordance with the principles of the present invention.

In particular, as shown in FIG. 4, when all messages are addressed to and processed through a single domain name on the Internet, i.e., an MMS intelligent content evaluator gateway 100, multiple send attempts to determine resolution are unnecessary. Use of the disclosed MMS intelligent content evaluator gateway 100 reduces the content to that which is acceptable by the receiving handset.

Figure 5:
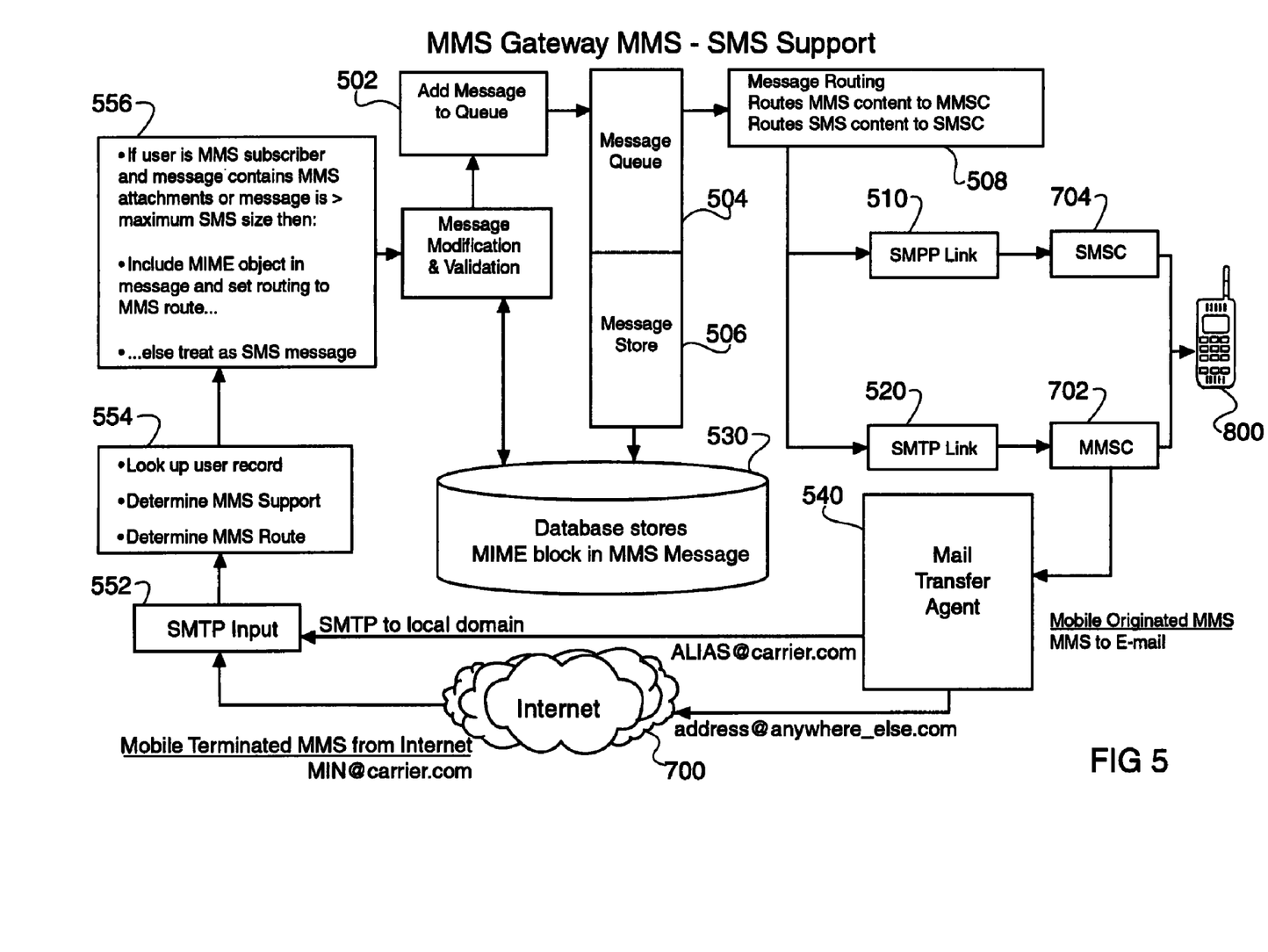
FIG. 5 shows software functions in an MMS gateway supporting both MMS and SMS with an address to a single Internet domain, in accordance with the principles of the present invention.

FIG. 5 also shows that messages may be filtered down from a full MMS message to a 'resolution' capable of being received by the relevant handset to which the message was addressed. This resolution may include e-mailing the plain text portion of an MMS message, and allowing the handset to download additional attachments should the handset be capable of receiving such attachment(s).

FIG. 5 shows software functions in an MMS intelligent content evaluator gateway 100 supporting both MMS and SMS with an address to a single Internet domain, in accordance with the principles of the present invention. FIG. 5 should be read in association with the following exemplary method in accordance with the principles of the present invention.

Step 1. Receive an SMTP message at the MMS intelligent content evaluator gateway 100 for processing.

Step 2. Qualify the message as having MMS content by examining the SMTP message DATA section for any header in the DATA section that starts with X-MMS. Exemplary headers include "X-Mms-Message-Type", "X-Mms-Transaction-Id", "X-Mms-Version", "X-Mms-Message-Class", "X-Mms-Priority", "X-Mms-Delivery-Report", "X-Mms-Read-Reply", "X-MMS-Content-Location", etc.

Step 3. Further qualify the message as having MMS content by comparing the message (MIME content) for attachment types that are provisioned in a database table 304 (FIGS. 3 and 4) of acceptable MMS content types.

Step 4. Examine the destination subscriber's handset capability record in the database 304 to determine if the handset can receive MMS messages.

Step 5. If the message contains only valid MMS content and the destination subscriber's handset supports MMS content, then route the message as an MMS message to the MMSC 702 serving the destination address.

Step 6. If the message contains text and does not contain MMS content, route the message as an SMS message to the SMSC 704 serving the destination address.

Step 7. If the message contains non-text content that is not indicated as MMS content in the MMS content types list, remove all non-text content, preserve any existing text content, replace the non-text content with tag fields consisting of the attachment names or MIME type and route the resulting text as an SMS message to the SMSC serving the destination address.

Step 8. If the message contains only valid MMS content but the destination subscriber handset does not support MMS, remove the non-text content, preserve any existing text content, replace the non-text content with tag fields consisting of the attachment names or MIME type and forward the resulting text as an SMS message to the SMSC 704 serving the destination address.

Step 9. Optional to step 8, store the MMS content in a suitable central message storage/retrieval database 302 (FIGS. 3 and 4) and send an SMS notification containing a URL address to the destination address instructing the destination subscriber on how to view the message from the Internet using a Web browser.

Step 10. Optional behavior for text only MMS messages. If the message contains only text, but has headers indicating it is an MMS message, and it is determined that the text will fit into an SMS message, construct an SMS message using the text and forward the resulting message for delivery to the SMSC 704 serving the destination address.

Step 11. Optional behavior for text only messages where the destination subscriber's handset supports MMS content and the configured maximum MMS message length for the handset is greater than the maximum SMS message length, route the message as a text only MMS message to the MMSC 702 serving the destination address.

Figure 6A:
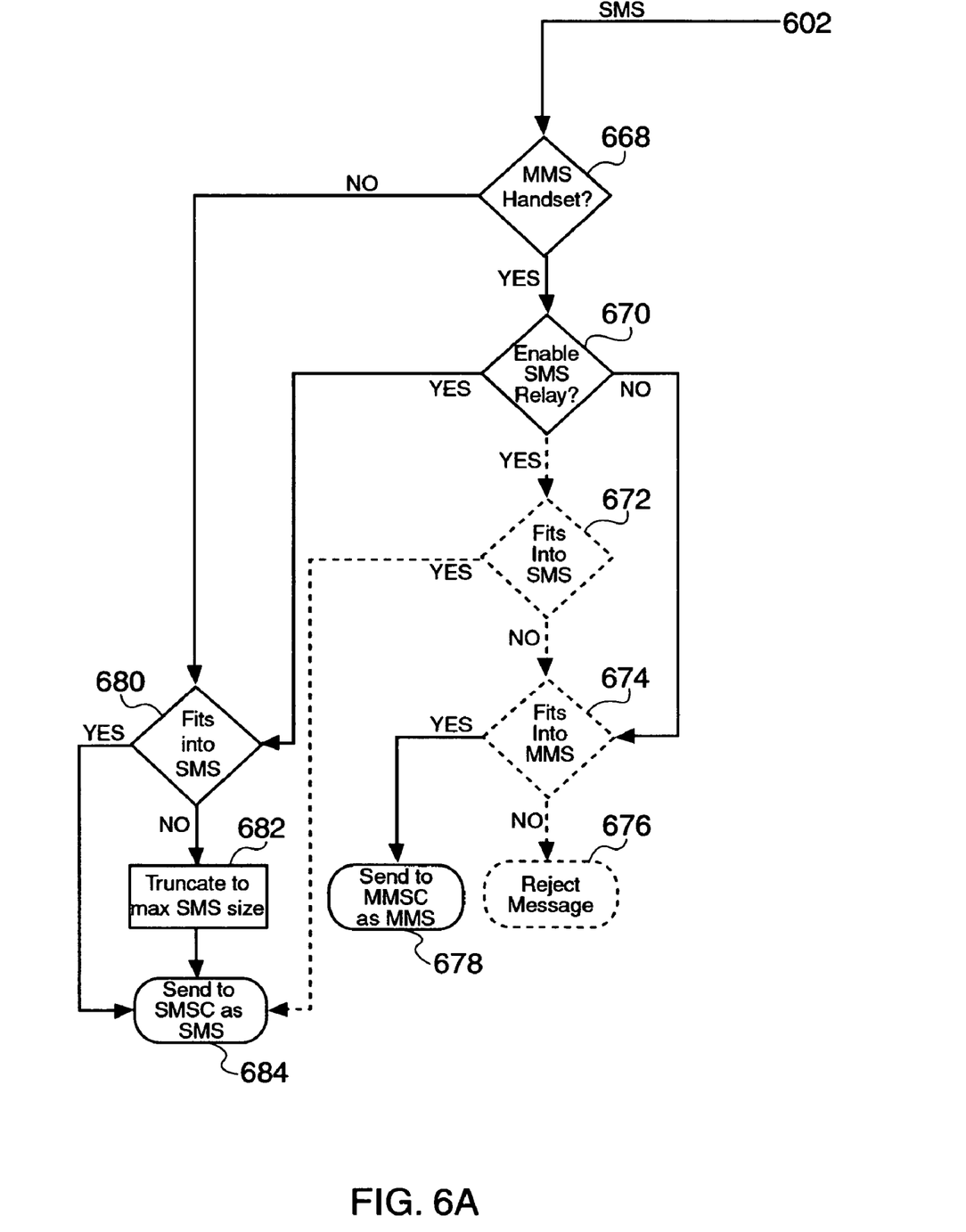
FIG. 6 shows an exemplary flow chart for relevant functions of an MMS intelligent content evaluator gateway in accordance with the principles of the present invention.
Figure 6B:
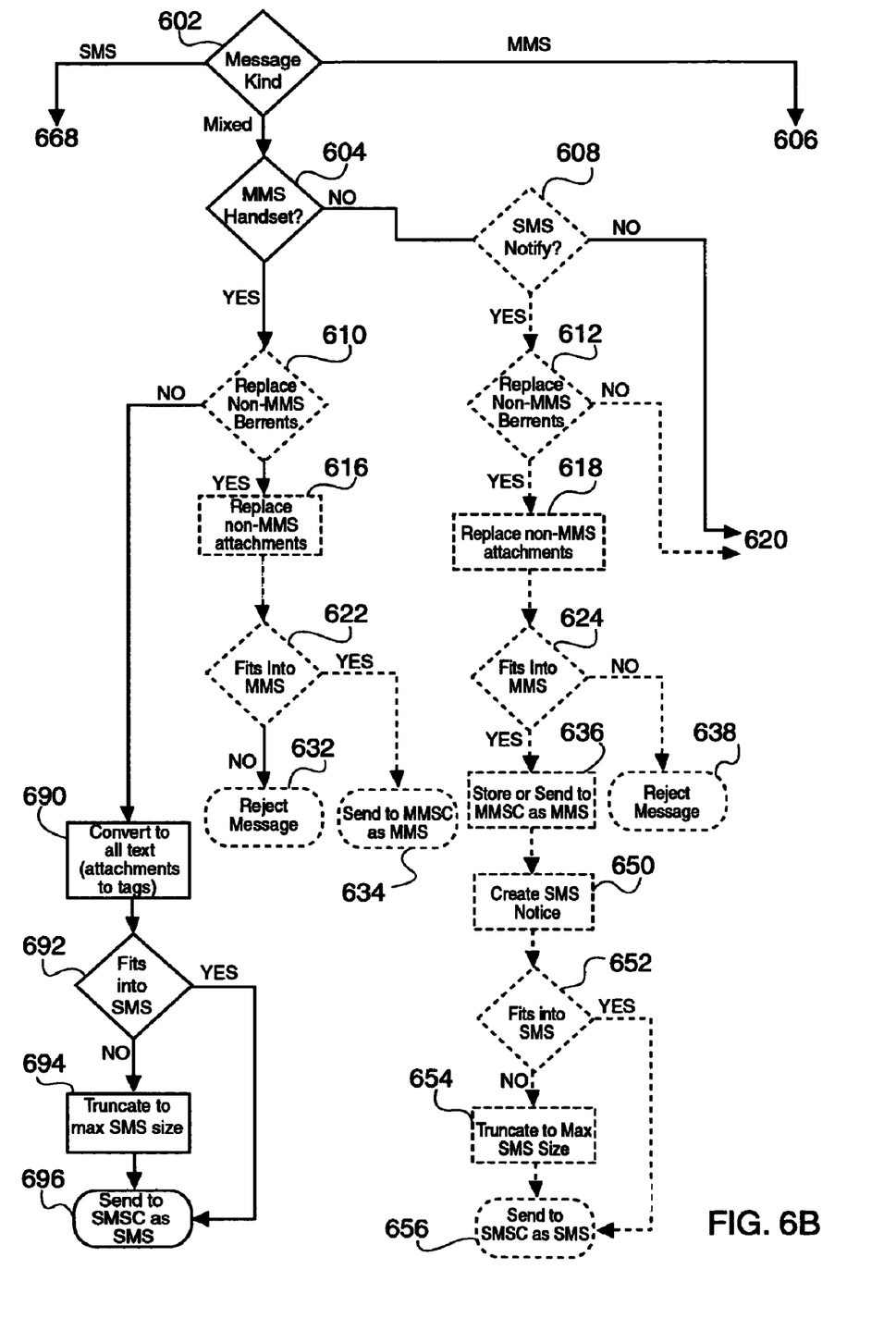
Figure 6C:
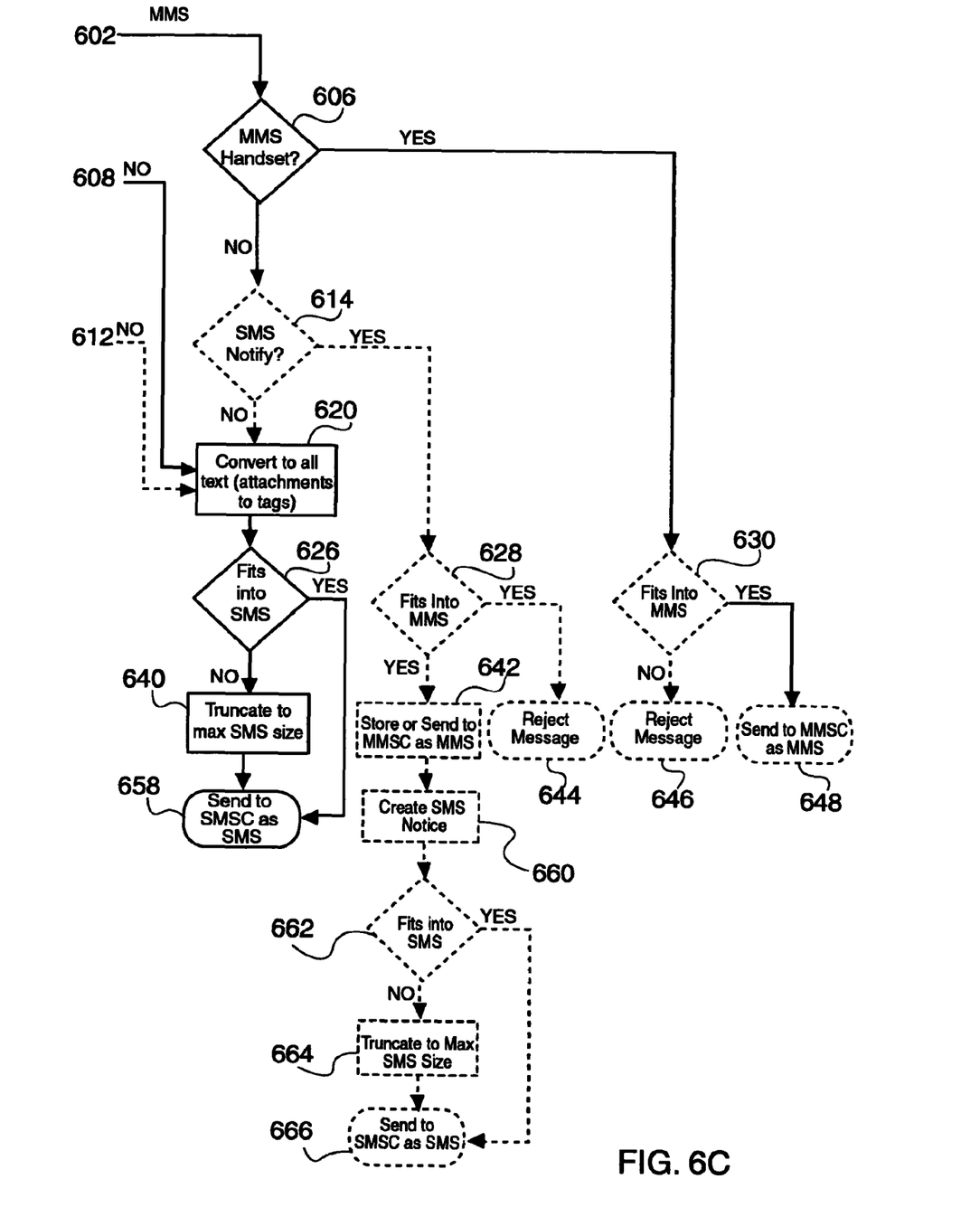

FIG. 6 shows an exemplary flow chart for relevant functions of an MMS intelligent content evaluator gateway 100 in accordance with the principles of the present invention.

In particular, as shown in step 602 of FIG. 6, a message received by the MMS intelligent content evaluator gateway 100 is evaluated, and the message type is detected. If the message type is MMS, the method passes toward the right in FIG. 6: if it's an SMS message the method passes toward the left in FIG. 6.

Thus, in the case of an SMS message type having been received, in step 668 it is determined whether or not the destination subscriber has an MMS capable handset or not. If not, the method passes to step 680, where it is determined whether or not the received message can be fit into an SMS message (e.g., within 160 characters). If so, then the received message is send to the servicing SMSC 704 as an SMS message, as shown in step 684. If not, in step 682, the received message is truncated to the maximum SMS message size, and forwarded to the SMSC as an SMS message in step 684.

If the destination subscriber's handset is MMS capable, as determined in step 668, then the method passes to step 670, where it is determined whether or not Enable SMS relay is desired. If so, then the method passes in essence to step 680, or as depicted in step 672. In step 674, it's determined whether or not the received message will fit into an MMS message. If so, the message is forwarded in step 678 to the MMSC 702 as an MMS message. If not, the message is rejected as shown in step 676. If the Enable SMS relay is not desired back in step 670, then the method passes directly to step 674.

If the message type is determined in step 602 to have been an MMS type message, then the method passes to step 606, where it's determined whether or not the destination subscriber has an MMS capable handset. If so, then the method passes to step 630, which fits the received message into an MMS format, and sends it to the MMSC 702 servicing the destination subscriber as an MMS message, otherwise the message is rejected in step 646.

If in step 606 the subscriber's handset was determined to not be MMS capable, even though the received message was an MMS type, then in step 614 it is determined in step 614 whether the subscriber is to be notified via an appropriate SMS message. If so, then the received message is fit into an MMS message in step 628, and the message is forwarded using Store or Send commands to the MMSC 702 as an MMS message in step 642; an SMS notification message is created in step 660, and in step 662 it's determined whether or not the notification message will fit into an SMS message. If so, then the notification message is sent to the subscriber's servicing SMSC 704 as an SMS message in step 666. Otherwise, the SMS notification message is truncated to the maximum SMS size in step 664, then forwarded to the SMSC 704 as an SMS message in step 666. If the message didn't fit into an MMS message format in step 628, then the message is rejected.

If SMS notification is not to be used in step 614, then the received message is converted to all text, and attachments to tags, in step 620. The converted message is fit into an SMS format message in step 626, and sent to the SMSC 704 as an SMS message in step 658. Otherwise, if the converted message didn't fit into the SMS format message, then the message is truncated to the maximum SMS size in step 640, and then sent to the SMSC 704 as an SMS message in step 658.

If, in step 602, the message is determined to be a 'mixed' message containing both SMS and MMS content, then the method passes to step 604, where it's determined whether or not the destination subscriber is capable of MMS message handling (i.e., display). If so, then it's determined if non-MMS elements are replaced in step 610, and if so then if non-MMS attachments are replaced in step 616. Then it is determined whether the message fits into an MMS format, in step 622. If so, then the message is sent to the servicing MMSC 702 as an MMS message, in step 634, otherwise the message is rejected in step 632.

In step 610, if the non-MMS elements are not replaced, then in step 690 the message is converted to all text, and all attachments to tags to be accessed by the destination subscriber, e.g., in a WAP application. In step 692, it is determined if the message fits into an SMS format. If so, then the message is forwarded to the SMSC 704 as an SMS message in step 696; otherwise it's truncated to the maximum SMS message size in step 694, then passed to step 696.

Back up at step 604, if the destination subscriber's handset is not MMS capable, then the method passes toward the right side of FIG. 6. In particular, it's determined whether an SMS notification message is to be sent in step 608. If not, then the method passes to step 620. If so, then in step 612 it's determined whether or not the non-MMS elements are replaced. If not, then the method passes to step 620. If so, then the method passes to step 618, where non-MMS attachments are replaced.

Then, in step 624, it's determined if the message fits into an MMS format. If not, then the message is rejected in step 638. If it does, then the message is forwarded in step 636 as a Store or Sent as an MMS message to the MMSC 702. An SMS notification message is created in step 650, and in step 652 it is determined whether or not the message fits into an SMS format. If so, it's sent in step 656 to the SMSC 704 servicing the destination subscriber as an SMS message. If not, in step 654 the message is truncated to fit into an SMS message formatted message, e.g., to the maximum SMS size, and passed to step 656 for forwarding to the SMSC 704 as an SMS message.

The principal benefit that this invention provides is that of enabling both MMS and SMS messages to be sent to a subscriber using a single address at a single Internet domain.

Other benefits derive from the fact that the Multimedia Messaging intelligent content evaluator gateway 100 provides a single point to apply carrier initiated control processing such as anti-"spam" (unsolicited email) checks and subscriber or carrier defined message manipulation or message blocking by sender address for all messages entering the network. Also, the Multimedia Messaging intelligent content evaluator gateway 100 provides a store-and-forward capability that prevents message loss in the event that an MMSC is momentarily out of service. Moreover, the message storage facility of the Multimedia Messaging intelligent content evaluator gateway 100 can be utilized as a central inbox to facilitate Web reporting or to consolidate and accumulate overall network messaging statistics. The present invention also allows for the integration of MMSCs and SMSCs from multiple vendors.

The envisioned market for the present invention includes all national and international wireless cell phone service providers and/or carriers offering or planning to offer Multimedia Messaging Services (MMS) in conjunction with Short Message Service (SMS).

While the invention has been described with reference to the exemplary embodiments thereof, those skilled in the art will be able to make various modifications to the described embodiments of the invention without departing from the true spirit and scope of the invention.

What is claimed is:

1. A wireless carrier message gateway, comprising:
   a network interface to receive a message in any of a plurality of message formats including multimedia (MMS) message format and short message service (SMS) message format, said message being addressed to a domain name assigned a single unique Universal Resource Locator (URL) assigned to a single wireless carrier message gateway;
   a content evaluator to determine a message format of said received message addressed to said single unique URL assigned to said single wireless carrier message gateway as being either said multimedia (MMS) message format or said short message service (SMS) message format; and
   a router to conditionally forward at least a portion of said received message to a multimedia messaging service center (MMSC) if said message format of said received message is determined to be said multimedia (MMS) message format, and to conditionally forward at least said portion of said received message to a short message service center (SMSC) if said message format of said message is determined to be said short message service (SMS) message format.

2. The wireless carrier message gateway according to claim 1, further comprising:
a database table defining a particular subscriber destination routing address to which SMS messages to said particular subscriber are to be forwarded from said wireless carrier message gateway.

3. The wireless carrier message gateway according to claim 1, further comprising:
a database table defining message capabilities of a subscriber's wireless device.

4. The wireless carrier message gateway according to claim 3, wherein said defined message capabilities include:
a definition informing that said subscriber's wireless device is capable of displaying SMS messages only.

5. The wireless carrier message gateway according to claim 3, wherein said defined message capabilities include:
a definition informing that said subscriber's wireless device is capable of displaying MMS messages.

6. The wireless carrier message gateway according to claim 1, further comprising:
an anti-spam filtering function within said wireless carrier message gateway operating on multiple messages intended for said destination subscriber.

7. The wireless carrier message gateway according to claim 6, wherein:
said multiple messages include SMS messages and MMS messages.

8. The wireless carrier message gateway according to claim 1, further comprising:
a store and forward capability that prevents message loss in the event that said MMSC is momentarily out of service.

9. The wireless carrier message gateway according to claim 1, further comprising:
a message storage facility located within said wireless carrier message gateway to facilitate, consolidate, and accumulate overall network messaging statistics.

10. A method of providing a single domain name for multiple message formats in a wireless network, comprising:
receiving, at a single wireless carrier message gateway, a message in any of a plurality of message formats including multimedia (MMS) message format and a short message service (SMS) message format, said message being addressed to a domain name assigned a single unique Universal Resource Locator (URL) assigned to said single wireless carrier message gateway;
determining, at said single wireless carrier message gateway, a message format of said received message addressed to said single unique URL assigned to said single wireless carrier message gateway as being either said multimedia (MMS) message format or said short message service (SMS) message format;
conditionally forwarding at least a portion of said received message to a multimedia messaging service center (MMSC) servicing said destination subscriber if said message content format of said received message is detected to be said multimedia (MMS) message format; and
conditionally forwarding at least said portion of said received message to a short message service center (SMSC) servicing said destination subscriber if said message format of said received message is detected to be said short message service (SMS) message format.

11. The method of providing a single domain name for multiple message formats in a wireless network according to claim 10, further comprising:
accessing a table entry to determine a message capability of said destination subscriber.

12. The method of providing a single domain name for multiple message formats in a wireless network according to claim 11, wherein:
said message capability for said destination subscriber relates that said subscriber's wireless device is capable of displaying SMS messages only.

13. The method of providing a single domain name for multiple message formats in a wireless network according to claim 11, wherein:
said message capability for said destination subscriber relates that said subscriber's wireless device is capable of displaying MMS messages.

14. Apparatus for providing a single domain name for multiple message formats in a wireless network, comprising:
means for receiving, at a single wireless carrier message gateway, a message in any of a plurality of message formats including multimedia (MMS) message format and a short message service (SMS) message format, said message being addressed to a domain name assigned a single unique Universal Resource Locator (URL) assigned to said single wireless carrier message gateway;
means for determining, at said single wireless carrier message gateway, a message format of said received message addressed to said single unique URL assigned to said single wireless carrier message gateway as being either said multimedia (MMS) message format or said short message service (SMS) message format;
means for conditionally forwarding at least a portion of said received message to a multimedia messaging service center (MMSC) servicing said destination subscriber if said determined message format of said received message is said multimedia (MMS) message format; and
means for conditionally forwarding at least said portion of said received message to a short message service center (SMSC) servicing said destination subscriber if said determined message format of said received message is said short message service (SMS) message format.

15. The apparatus for providing a single domain name for multiple message formats in a wireless network according to claim 14, further comprising:
means for accessing a table entry to determine a message capability of said destination subscriber.

16. The apparatus for providing a single domain name for multiple message formats in a wireless network according to claim 15, wherein:
said message capability for said destination subscriber relates that said subscriber's wireless device is capable of displaying SMS messages only.

17. The apparatus for providing a single domain name for multiple message formats in a wireless network according to claim 15, wherein:
said message capability for said destination subscriber relates that said subscriber's wireless device is capable of displaying MMS messages.

* * * * *